United States Patent
Hiraoka et al.

(10) Patent No.: US 8,541,986 B2
(45) Date of Patent: Sep. 24, 2013

(54) CHARGING METHOD AND CHARGER FOR NON-AQUEOUS ELECTROLYTE SECONDARY BATTERY

(75) Inventors: Tatsuki Hiraoka, Osaka (JP); Masaya Ugaji, Osaka (JP); Taisuke Yamamoto, Nara (JP); Katsumi Kashiwagi, Nara (JP)

(73) Assignee: Panasonic Corporation, Osaka (JP)

( * ) Notice: Subject to any disclaimer, the term of this patent is extended or adjusted under 35 U.S.C. 154(b) by 186 days.

(21) Appl. No.: 13/122,096

(22) PCT Filed: Jun. 15, 2010

(86) PCT No.: PCT/JP2010/003955
§ 371 (c)(1),
(2), (4) Date: Mar. 31, 2011

(87) PCT Pub. No.: WO2011/033704
PCT Pub. Date: Mar. 24, 2011

(65) Prior Publication Data
US 2011/0267001 A1    Nov. 3, 2011

(30) Foreign Application Priority Data
Sep. 18, 2009  (JP) .................................. 2009-216446

(51) Int. Cl.
*H02J 7/00*   (2006.01)
(52) U.S. Cl.
USPC ........................................................ 320/162
(58) Field of Classification Search
USPC .................. 320/149, 162, 164, 157–159, 163
See application file for complete search history.

(56) References Cited

U.S. PATENT DOCUMENTS

| | | | |
|---|---|---|---|
| 6,075,339 A * | 6/2000 | Reipur et al. | 320/110 |
| 6,377,030 B1 * | 4/2002 | Asao et al. | 320/161 |
| 7,274,171 B2 * | 9/2007 | Nishida et al. | 320/137 |
| 2008/0054851 A1 | 3/2008 | Nozawa | |
| 2008/0315845 A1 | 12/2008 | Van Der Velden et al. | |
| 2009/0273320 A1 * | 11/2009 | Ungar et al. | 320/162 |
| 2011/0012563 A1 * | 1/2011 | Paryani et al. | 320/162 |
| 2011/0181249 A1 * | 7/2011 | Deguchi et al. | 320/149 |

FOREIGN PATENT DOCUMENTS

| | | |
|---|---|---|
| JP | 07-296853 | 11/1995 |
| JP | 2000-106219 A | 4/2000 |

(Continued)

OTHER PUBLICATIONS

Japanese Office Action issued in Japanese Application No. 2011-531764 issued on Jun. 21, 2012.

*Primary Examiner* — Ramy Ramadan
(74) *Attorney, Agent, or Firm* — McDermott Will & Emery LLP

(57) ABSTRACT

In a charging method for a non-aqueous electrolyte secondary battery which includes a positive electrode including a lithium-containing composite oxide as an active material, a negative electrode including an alloy-formable negative electrode active material, and a non-aqueous electrolyte, a voltage of the secondary battery is detected. When the detected value is smaller than a predetermined voltage x, charging is performed at a comparatively small current value B. When the detected value is equal to or greater than the predetermined voltage x and smaller than a predetermined voltage z, charging is performed at a comparatively great current value A. When the detected value is equal to or greater than the predetermined voltage z and smaller than a predetermined voltage y, charging is performed at a comparatively small current value C. When the detected value is greater than the predetermined voltage y, constant-voltage charging is performed or charging is terminated. Here, x<z<y.

8 Claims, 6 Drawing Sheets

(56) References Cited

FOREIGN PATENT DOCUMENTS

| | | |
|---|---|---|
| JP | 2004-320914 | 11/2004 |
| JP | 2006-351489 | 12/2006 |
| JP | 2007-318855 | 12/2007 |
| JP | 2007-327772 | 12/2007 |
| JP | 2008-141873 | 6/2008 |
| JP | 2009-158142 | 7/2009 |
| WO | WO 2007/069196 A2 | 6/2007 |

* cited by examiner

CHARGING METHOD AND CHARGER FOR NON-AQUEOUS ELECTROLYTE SECONDARY BATTERY

RELATED APPLICATIONS

This application is the U.S. National Phase under 35 U.S.C. §371 of International Application No. PCT/JP2010/003955, filed on Jun. 15, 2010, which in turn claims the benefit of Japanese Application No. 2009-216446, filed on Sep. 18, 2009, the disclosures of which Applications are incorporated by reference herein.

TECHNICAL FIELD

The present invention relates to a charging method and a charger for a non-aqueous electrolyte secondary battery including a positive electrode including a lithium-containing composite oxide as an active material, a negative electrode including an alloy-formable material as an active material, and a non-aqueous electrolyte.

BACKGROUND ART

Secondary batteries including a non-aqueous electrolyte (i.e., non-aqueous electrolyte secondary batteries) such as lithium ion secondary batteries are generally charged by a method of constant-current and constant-voltage charging. In constant-current and constant-voltage charging, charging is performed at a constant current until the battery voltage reaches a predetermined voltage. After the battery voltage has reached the predetermined voltage, the charge current is reduced so that the battery voltage is maintained at the predetermined voltage. When the charge current is reduced to a predetermined value, charging is terminated.

With regard to constant-current and constant-voltage charging, Patent Literature 1 discloses the following technique.

In constant-current and constant-voltage charging, if the charge cutoff voltage of a battery is set high, the decomposition of the electrolyte on the positive electrode and the destruction of crystals of the positive electrode active material are accelerated, and the cycle characteristics deteriorate. In order to avoid this, charging is performed at a large current at the beginning of charging. The charge current is reduced immediately after the battery voltage has reached a charge cutoff voltage. By reducing the charge current, the battery voltage is reduced. When the battery voltage reaches the charge cut-off voltage again, the charge current is further reduced. These procedures are repeated. In such a manner, charging is performed at a large current at the beginning of charging, and then the charge current is reduced stepwise.

Patent Literature 2 proposes the following technique.

In constant-current charging, rapid charging is performed at a comparatively large current of 1.2 to 4.0 It while the state of charge is low. After the state of charge (SOC) is increased, charging is performed at a current of 1.2 It or less. By doing this, the charging time can be shortened, and the deterioration in cycle characteristics can be suppressed.

CITATION LIST

Patent Literature

[PTL 1] Japanese Laid-Open Patent Publication No. Hei 7-296853
[PTL 2] Japanese Laid-Open Patent Publication No. 2009-158142

SUMMARY OF INVENTION

Technical Problem

In Patent Literatures 1 and 2, in order to shorten the charging time and to improve the cycle characteristics, constant-current charging is performed in such a manner that charging is started with a large charge current and then the charge current is reduced. However, there is no sufficient theoretical basis for how the controlling of the charge current in such a manner can improve the cycle characteristics of a secondary battery.

The present inventors have conducted detailed analysis on the relationship between a state of charge and an internal resistance of a secondary battery, by the GITT (Galvanostatic Intermittent Titration Technique) method. As a result, the inventors have found that when the above-described conventional techniques are applied, there is a possibility that the charge polarization greatly varies in association with the state of charge, which, contrary to the intended purpose, causes the cycle characteristics of the secondary battery to deteriorate.

On the basis of the foregoing new findings on the relationship between a state of charge and an internal resistance, the present invention intends to provide a charging method and a charger for a non-aqueous electrolyte secondary battery that can improve the characteristics relating to service life of a non-aqueous electrolyte secondary battery, particularly of a non-aqueous electrolyte secondary battery using an alloy-formable active material in a negative electrode.

Solution to Problem

One aspect of the present invention is a charging method for a non-aqueous electrolyte secondary battery which comprises a positive electrode including a lithium-containing composite oxide as an active material, a negative electrode including an alloy-formable negative electrode active material, and a non-aqueous electrolyte, the charging method comprising the steps of:

(a) detecting a state of charge of the secondary battery;

(b) comparing the detected state of charge with a predetermined value X and a predetermined value Y satisfying Y>X; and (c) on the basis of the comparison result, (i) when the detected state of charge is equal to or higher than the predetermined value Y, performing constant-voltage charging or terminating charging, (ii) when the detected state of charge is equal to or higher than the predetermined value X and lower than the predetermined value Y, performing constant-current charging at a current value A until the detected state of charge reaches a predetermined state of charge, or (iii) when the detected state of charge is lower than the predetermined value X, performing constant-current charging at a current value B satisfying B<A.

Another aspect of the present invention is a charger for a non-aqueous electrolyte secondary battery which comprises a positive electrode including a lithium-containing composite oxide as an active material, a negative electrode including an alloy-formable negative electrode active material, and a non-aqueous electrolyte, the charger comprising:

a voltage detection unit for detecting a voltage of the secondary battery;

a state-of-charge detection unit for detecting a state of charge of the secondary battery on the basis of the detected voltage;

a current supply circuit for supplying a current from an external or internal DC power supply to the secondary battery with changing a value of the current stepwise;

a switch for switching an electrically connected state between the secondary battery and the current supply circuit;

a judgment unit for comparing the detected state of charge with a predetermined value X and a predetermined value Y satisfying Y>X, to make judgment on the detected state of charge; and a control unit for controlling the switch and the current supply circuit on the basis of the judgment of the judgment unit, in such a manner that (i) when the detected state of charge is equal to or higher than the predetermined value Y, performing constant-voltage charging or terminating charging, (ii) when the detected state of charge is equal to or higher than the predetermined value X and lower than the predetermined value Y, performing constant-current charging at a current value A until the detected state of charge reaches a predetermined state of charge, or (iii) when the detected state of charge is lower than the predetermined value X, performing constant-current charging at a current value B satisfying B<A.

Advantageous Effects of Invention

According to the present invention, the characteristics relating to service life of a non-aqueous electrolyte secondary battery, particularly of a non-aqueous electrolyte secondary battery using an alloy-formable active material in a negative electrode, can be improved.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
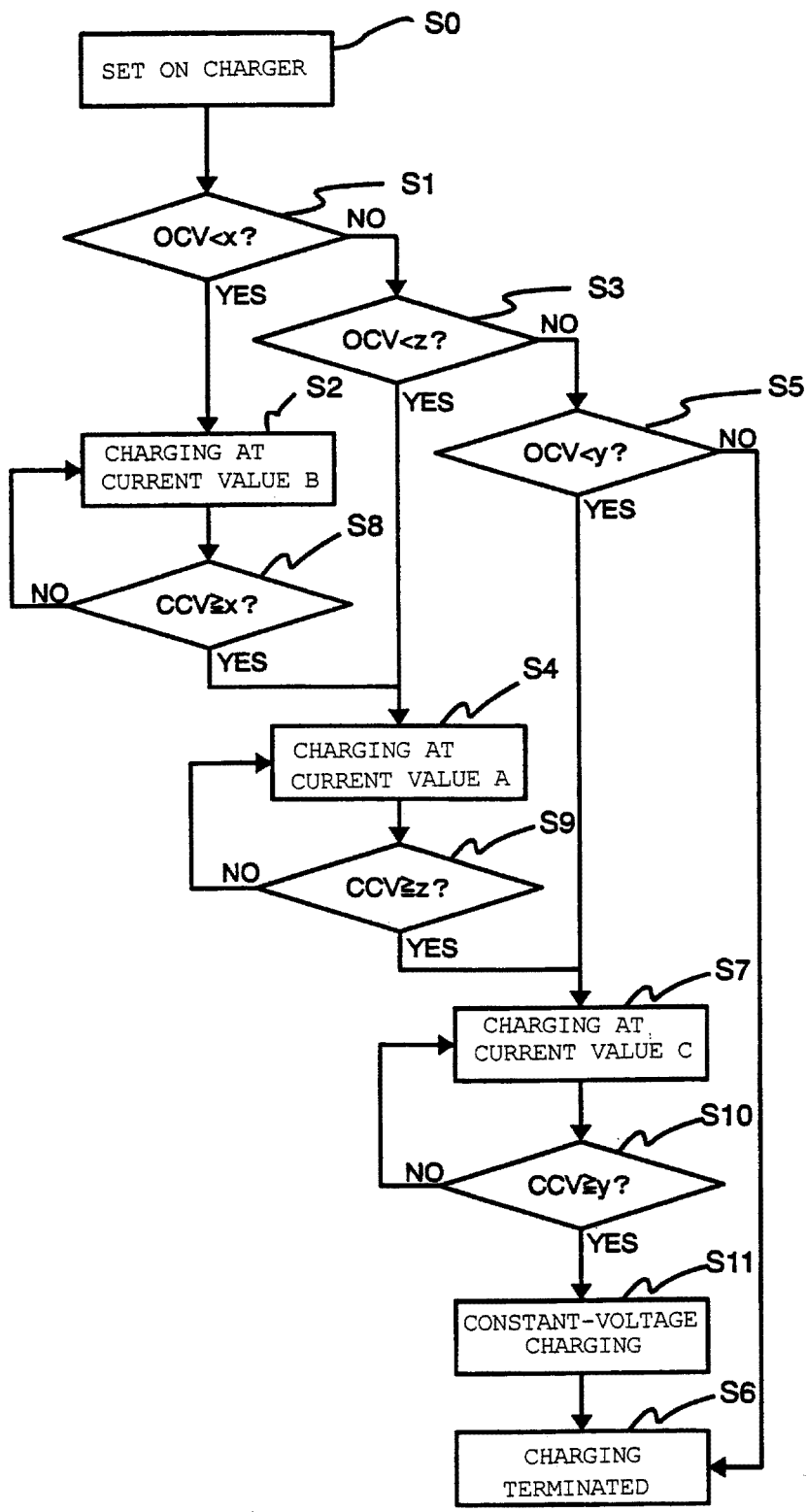
FIG. 1 is a flowchart of a charging method for a non-aqueous electrolyte secondary battery according to one embodiment of the present invention.

A charging method for a non-aqueous electrolyte secondary battery according to one embodiment of the present invention is a method for charging a non-aqueous electrolyte secondary battery including a positive electrode including a lithium-containing composite oxide as an active material, a negative electrode including an alloy-formable negative electrode active material, and a non-aqueous electrolyte.

This charging method includes the steps of: (a) detecting a state of charge of the secondary battery; (b) comparing the detected state of charge with a predetermined value X and a predetermined value Y satisfying Y>X; and (c) on the basis of the comparison result, (i) when the detected state of charge is equal to or higher than the predetermined value Y, performing constant-voltage charging or terminating charging, (ii) when the detected state of charge is equal to or higher than the predetermined value X and lower than the predetermined value Y, performing constant-current charging at a current value A until the detected state of charge reaches a predetermined state of charge, or (iii) when the detected state of charge is lower than the predetermined value X, performing constant-current charging at a current value B satisfying B<A.

As described above, in the charging method for a non-aqueous electrolyte secondary battery according to one embodiment of the present invention, at the beginning of charging when the battery is nearly in a fully discharged state, charging is performed at the current value B, which is comparatively small, and then, after the state of charge is increased to a certain extent, charging is performed at the current value A, which is comparatively great.

The present inventors have conducted analysis on the relationship between a state of charge and an internal resistance of a secondary battery by the GITT method. As a result, the inventors have found that in a secondary battery using a positive electrode including a lithium-containing composite oxide, the internal resistance of the battery is extremely high when the state of charge is low, but the internal resistance drops sharply when the state of charge is increased to a certain extent. This means that if the battery is charged at a constant current from the beginning of charge when the state of charge is low to the end of charge when the battery is fully charged, the charge polarization greatly varies as the internal resistance varies, causing charging irregularity (non-uniform charging). As a result, for example, the negative electrode active material layer anisotropically expands to cause a separation of negative electrode active material, the electrolyte is decomposed, the crystals of positive electrode active material are decomposed, or reducing gas is generated inside the battery. Consequently, the cycle characteristics of the non-aqueous electrolyte secondary battery deteriorate. Moreover, the internal pressure is increased, causing the non-aqueous electrolyte secondary battery to be expanded or deformed.

Therefore, by charging a secondary battery at a comparatively small current value B at the beginning of charging when the internal resistance in the secondary battery is high, and then charging the secondary battery at a comparatively great current value A after the internal resistance in the secondary battery has been reduced, the charge polarization can be prevented from varying greatly. As a result, the charging irregularity can be suppressed, which makes it possible to improve the cycle characteristics of the non-aqueous electrolyte secondary battery, as well as to suppress the expansion and deformation of the non-aqueous electrolyte secondary battery due to an increase in the internal pressure.

In particular, the charging irregularity can be suppressed in an alloy-formable negative electrode active material whose expansion rate during charging is large, which makes it possible to suppress an uneven expansion of the negative electrode active material during charging, and thus the cycle characteristics can be significantly improved. In addition, this makes it possible to suppress the separation of negative electrode active material from the electrode, and thus the safety of the non-aqueous electrolyte secondary battery can be improved.

A charging method for a non-aqueous electrolyte secondary battery according to another embodiment of the present invention further includes the steps of (d) comparing the detected state of charge with a predetermined value Z satisfying Y>Z>X, and when the detected state of charge is equal to or higher than the predetermined value Z and lower than the predetermined value Y, performing constant-current charging at a current value C satisfying C<A.

As described above, the internal resistance of a secondary battery is extremely high when the state of charge is low, and drops sharply when the state of charge becomes high. However, when the state of charge becomes higher than a certain level, the internal resistance of the secondary battery which has dropped starts increasing again (see FIG. 5). As such, by charging at a current value C smaller than the current value A while the state of charge is higher than a certain level, the variation in charge polarization can be minimized. As a result, more notable effects such as an effect to improve the cycle characteristics of the non-aqueous electrolyte secondary battery can be obtained.

The state of charge of a secondary battery can be measured by detecting an open circuit voltage or a closed circuit voltage of the secondary battery. The predetermined value X is preferably set at a state of charge of 5 to 30%, and the predetermined value Z is preferably set at a state of charge of 65 to 90%. The current value B is preferably set to 10 to 60% of the current value A, and the current value C is preferably set to 10 to 75% of the current value A.

A charger for a non-aqueous electrolyte secondary battery according to one embodiment of the present invention is a charger for charging a non-aqueous electrolyte secondary battery including a positive electrode including a lithium-containing composite oxide as an active material, a negative electrode including an alloy-formable negative electrode active material, and a non-aqueous electrolyte.

This charger includes: a voltage detection unit for detecting a voltage of the secondary battery; a state-of-charge detection unit for detecting a state of charge of the secondary battery on the basis of the detected voltage; a current supply circuit for supplying a current from an external or internal DC power supply to the secondary battery with changing a value of the current stepwise; a switch for switching an electrically connected state between the secondary battery and the current supply circuit; a judgment unit for comparing the detected state of charge with a predetermined value X and a predetermined value Y satisfying Y>X, to make judgment on the detected state of charge, and a control unit.

The control unit is configured to control the switch and the current supply circuit on the basis of the judgment of the judgment unit, in such a manner that: (i) when the detected state of charge is equal to or higher than the predetermined value Y, performing constant-voltage charging or terminating charging; (ii) when the detected state of charge is equal to or higher than the predetermined value X and lower than the predetermined value Y, performing constant-current charging at a current value A until the detected state of charge reaches a predetermined state of charge; or (iii) when the detected state of charge is lower than the predetermined value X, performing constant-current charging at a current value B satisfying B<A.

Embodiments of the present invention are described below with reference to the drawings.

Embodiment 1

Figure 2:
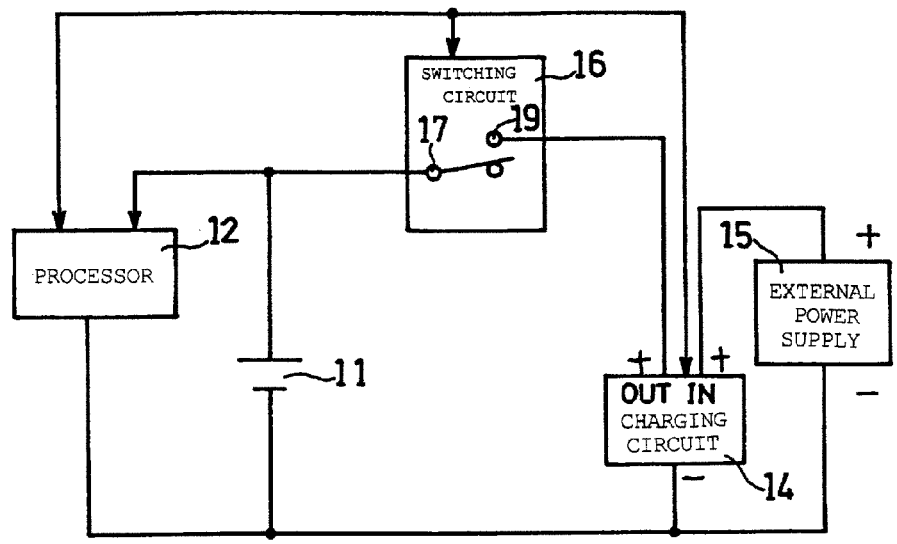
FIG. 2 is a block diagram showing a schematic configuration of a charger for a non-aqueous electrolyte secondary battery to which the charging method shown in FIG. 1 is applied.

FIG. 1 is a flowchart of a charging method for a non-aqueous electrolyte secondary battery according to one embodiment of the present invention. FIG. 2 is a block diagram showing a schematic configuration of an example of a charger to which the charging method shown in FIG. 1 is applied.

The charger includes a processor 12, a charging circuit 14, and a switching circuit 16. A non-aqueous electrolyte secondary battery (hereinafter simply referred to as a "battery") 11 is set on the charger and is connected in parallel with the processor 12 including a voltage detection unit for detecting a terminal voltage of the battery. In this state, the open circuit voltage of the battery 11 is detected.

Figure 3:
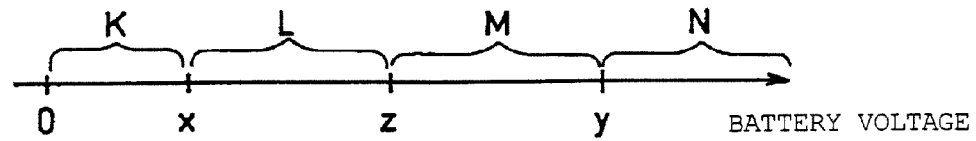
FIG. 3 is a diagram schematically showing regions of battery voltage determined by the method shown in FIG. 1.

The processor 12 further includes a judgment unit, such as a judging circuit, for comparing the detected value of voltage with predetermined voltages x, y and z satisfying x<z<y, and determining in which of following voltage regions as shown in FIG. 3 the detected value falls: the voltage region K of smaller than the predetermined voltage x, the voltage region L of equal to or greater than the predetermined voltage x and smaller than the predetermined voltage z, the voltage region M of equal to or greater than the predetermined voltage z and smaller than the predetermined voltage y, and the voltage region N of equal to or greater than the predetermined voltage y.

The processor 12 further includes a control unit for controlling the charging circuit 14 and the switching unit 16 on the basis of the judgment of the judgment unit.

An input circuit (not shown) in the charging circuit 14 and an external power supply 15 form a closed circuit. During the charging of the secondary battery 11, an output circuit (not shown) in the charging circuit 14 and the secondary battery 11 form a closed circuit by an action of the switching circuit 16. At this time, the voltage detection unit detects a closed circuit voltage of the battery 11. The external power supply 15 may be replaced with an internal power supply mounted in the charger.

The charging circuit 14 can perform constant-current charging and constant-voltage charging in a switchable manner. Further, the charging circuit 14 can perform the constant-current charging with a charge current being switched stepwise. Specifically, the current value is switchable among comparatively small current values B and C and a comparatively great current value A. The current value B may be set to 10 to 60% of the current value A. The current value C may be set to 10 to 75% of the current value A. The current values B and C may be the same, but it is preferable that the current value C is greater than the current value B. The switching between constant-current charging and constant-voltage charging, the switching of the charge current, and the like are controlled by the control unit, on the basis of the judgment of the judgment unit.

The charging circuit 14 is communicated with the above-described processor 12 including the voltage detection unit, judgment unit, and control unit. The judgment unit and the control unit may be included in the charging circuit 14. In this configuration, the information on the detected voltage value is transmitted from the processor 12 to the charging circuit 14.

The negative electrode of the battery 11 and the negative electrode terminal of the charging circuit 14 each have the same potential as the negative electrode terminal of the external power supply 15. The positive electrode of the battery 11 and the positive electrode terminal of the output circuit in the charging circuit 14 are connected to predetermined terminals 17 and 19, respectively, included in the switching circuit 16.

The switching circuit 16 includes a charge switch for controlling the connection between the positive electrode of the battery 11 and the positive electrode terminal of the output circuit in the charging circuit 14. When the charge switch is turned on, the positive electrode of the battery 11 and the positive electrode terminal of the output circuit in the charging circuit 14 are connected to each other; and when the charge switch is turned off, the connection is broken.

The switching circuit 16 is communicated with the above-described processor 12 including the voltage detection unit, judgment unit, and control unit. The switching circuit 16 is controlled by the control unit, on the basis of the judgment of the judgment unit.

When the charge switch in the switching circuit 16 is turned on, and the positive electrode terminal of the battery 11 and the positive electrode terminal of the output circuit in the charging circuit 14 are connected to each other, the charging unit 14 starts charging the battery 11 according to the instruction from the processor 12. The closed circuit voltage of the battery 11 while being charged is monitored by the processor 12. Alternatively, when the charging circuit 14 includes the judgment unit, the closed circuit voltage of the battery 11 while being charged is monitored by the charging circuit 14.

Among the voltage detection unit, judgment unit, and control unit in the processor 12, only the control unit may be included in the charging circuit 14. In this configuration, necessary information is input to the control unit from the judgment unit and the like in the processor 12.

The processor, voltage detection unit, judgment unit, and control unit may be configured with a microcomputer, a wired logic circuit, or the like.

The battery 11 may be a lithium ion secondary battery using a lithium-containing composite oxide as a positive electrode active material, and an alloy-formable negative electrode active material as a negative electrode active material.

The lithium-containing composite metal oxide used here is a composite oxide mainly containing lithium and nickel. The lithium-containing composite metal oxide is a metal oxide containing lithium and a transition metal, or a metal oxide in which the transition metal in the above metal oxide is partially replaced with a different element. Examples of the different element include Na, Mg, Sc, Y, Mn, Fe, Co, Ni, Cu, Zn, Al, Cr, Pb, Sb and B. Preferred different elements among these include Mn, Al, Co, Ni and Mg. These different elements may be used singly or in combination of two or more.

For example, $Li_1CoO_2$, $Li_1NiO_2$, $Li_1MnO_2$, $Li_1Co_mNi_{1-m}O_2$, $Li_1Co_mM_{1-m}O_n$, $Li_1Ni_{1-m}M_mO_n$, $Li_1Mn_2O_4$, and $Li_1Mn_{2-m}O_4$, where M is at least one element selected from the group consisting of Na, Mg, Sc, Y, Mn, Fe, Co, Ni, Cu, Zn, Al, Cr, Pb, Sb and B; $0<l\leq1.2$, $0\leq m\leq0.9$; and $2.0\leq n\leq2.3$, are listed.

Here, the value "1" representing a molar ratio of lithium in the positive electrode active material immediately after production, and increases or decreases during charging and discharging. A preferred lithium-containing composite metal oxide among these is the one represented by the composition formula: $Li_1Ni_mM_{1-m}O_n$, where M, l, m and n are the same as above. Further, examples of an olivine-type lithium phosphate include $LiDPO_4$ and $Li_2DPO_4F$, where D is at least one selected from the group consisting of Co, Ni, Mn and Fe.

These positive electrode active materials may be used singly or in combination of two or more.

Examples of the alloy-formable negative electrode active material include silicon oxides, silicon, silicon alloys, tin oxides, tin, and tin alloys. Among these, silicon oxides are particularly preferred. Silicon oxides are represented by the general formula $SiO_e$, where $0<e<2$, and more preferably $0.01\leq e\leq1$. Metal elements other than silicon in silicon alloys are preferably metal elements not alloyable with lithium, such as titanium, copper and nickel.

Next, one example of carrying out the charging method of the present invention with the charger as shown in FIG. 2 is described below with reference to the flowchart of FIG. 1.

First, the battery 11 is set on the charger (S0). Upon setting, while the charge switch in the switching circuit 16 is turned off, the voltage detection unit in the processor 12 detects an open circuit voltage of the battery 11.

Secondly, the judgment unit in the processor 12 compares the detected open-circuit voltage (OCV) with a predetermined voltage x (S1). Here, the predetermined voltage x is a voltage corresponding to a comparative low state of charge (the predetermined value X) of the battery 11. For example, the predetermined voltage x is a voltage corresponding to a state of charge (SOC) of 5 to 30%.

When the comparison result is OCV<x, the battery 11 is nearly in a fully discharged state. When OCV<x, the processor 12 turns on the charge switch in the switching circuit 16, and sets the output from the charging circuit 14 such that charging is performed at a comparatively small current value B (S2).

When OCV≧x, the judgment unit in the processor 12 further compares the detected value (OCV) with a predetermined voltage z (S3). Here, the predetermined voltage z is a voltage corresponding to a comparatively high state of charge (the predetermined value Z) of the battery 11. For example, the predetermined voltage z is a voltage of the battery 11 whose state of charge is within the range of 65 to 90%.

When the comparison result is OCV<z, namely, x≦OCV<z, the battery 11 is in a moderate state of charge. When OCV<z, the processor 12 sets the output from the charging circuit 14 such that charging is performed at a comparatively great current value A satisfying A>B (S4).

When OCV≧z, the judgment unit in the processor 12 further compares the detected value (OCV) with a predetermined voltage y (S5). Here, the predetermined voltage y is a voltage corresponding to a battery voltage in a fully charged state or a state of charge of the battery 11 at which charging should be switched to constant-voltage charging (the predetermined value Y). The predetermined voltage y is preferably a voltage within ±0.05 V of a recommended charge cutoff voltage of secondary batteries. Further, the predetermined voltage y may be a voltage within ±1% of a nominal voltage of secondary batteries.

When the comparison result is OCV≧y, the battery 11 is regarded as fully charged, and no charging is performed (S6).

When OCV<y, namely, z≦OCV<y, the state of charge of the battery 11 is comparatively high. When OCV<y, charging is performed at a current value C satisfying C<A (S7).

During the charging at the current value B (S2), at the time when a predetermined period of time has passed from the start of the charging, the closed circuit voltage (CCV) of the battery 11 is detected, and compared with the predetermined voltage x (S8). When the CCV is below the predetermined voltage x, the charging at the current value B is continued (S2). When the CCV is or exceeds the predetermined voltage x, the charging is switched to a charging at the current value A (S4). The step S8 is repeated every time when the predetermined period of time has passed, until the CCV reaches the predetermined voltage x. It should be noted that the predetermined voltage x to be compared with the OCV may be different from that to be compared with the CCV.

During the charging at the current value A (S4), at the time when a predetermined period of time has passed from the start of the charting, the closed circuit voltage (CCV) of the battery 11 is detected, and compared with the predetermined voltage z (S9). When the CCV is below the predetermined voltage z, the charging at the current value A is continued (S4). When the CCV is or exceeds the predetermined voltage z, the charging is switched to a charging at the current value C (S7). The step S9 is repeated every time when the predetermined period of time has passed, until the CCV reaches the predetermined voltage z. It should be noted that the predetermined voltage z to be compared with the OCV may be different from that to be compared with the CCV.

During the charging at the current value C (S7), at the time when a predetermined period of time has passed from the start of the charting, the closed circuit voltage (CCV) of the battery 11 is detected, and compared with the predetermined voltage y (S10). When the CCV is below the predetermined voltage y, the charging at the current value C is continued (S7). When the CCV is or exceeds the predetermined voltage y, the charging is switched to a predetermined constant-voltage charging (S11). The step S10 is repeated every time when the predetermined period of time has passed, until the CCV reaches the predetermined voltage y. It should be noted that the predetermined voltage y to be compared with the OCV may be different from that to be compared with the CCV.

When the constant-voltage charging is completed, the battery 11 is regarded as fully charged, and the charging is terminated (S6).

Figure 4:
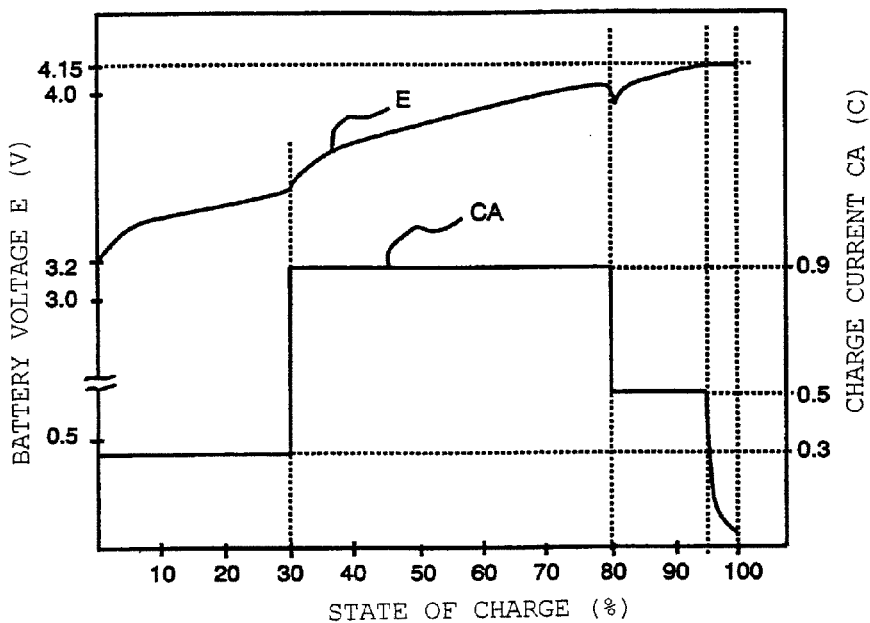
FIG. 4 is a graph showing one example of the relationship among a battery voltage, a charge current, and a state of charge, when a secondary battery is charged by the method shown in FIG. 1.

FIG. 4 shows, in the form of a graph, the relationship between a state of charge, and a battery voltage and a charge current, when the battery is charged by following the procedures shown in FIG. 1.

In FIG. 4, a secondary battery is charged such that the battery voltage E is increased from 3.2 V (a fully discharged state) to 4.15 V (a full state of charge). In this charging, constant-current charging is performed until the state of charge reaches about 95%, after which constant-voltage charging is performed. In the constant-current charging, the charge current CA is changed in three stages.

Specifically, in the range where the state of charge is lower than 30% (the predetermined value X), the current CA is 0.3 C (the current value B); in the range where the state of charge is 30% or higher and lower than 80% (the predetermined value Z), the current CA is 0.9 C (the current value A); and in the range where the state of charge is 80% or higher and lower than 95% (the predetermined value Y), the current CA is 0.5 C (the current value C). In the range where the state of charge is 95% or higher, the charge voltage is constant (4.15 V), and the current CA reduces over time (the constant-voltage charging).

Here, the current values 0.3 C, 0.5 C and 0.9 C are current values 0.3 times, 0.5 times and 0.9 times as great as the theoretical current value (1.0 C) at which the rated capacity of the secondary battery can be charged in one hour, respectively. For example, provided that the rated capacity of the secondary battery is 2000 mAh, 1.0 C, 0.3 C, 0.5 C and 0.9 C correspond to 2000 mAh, 600 mAh, 1000 mAh and 1800 mAh, respectively.

Figure 5:
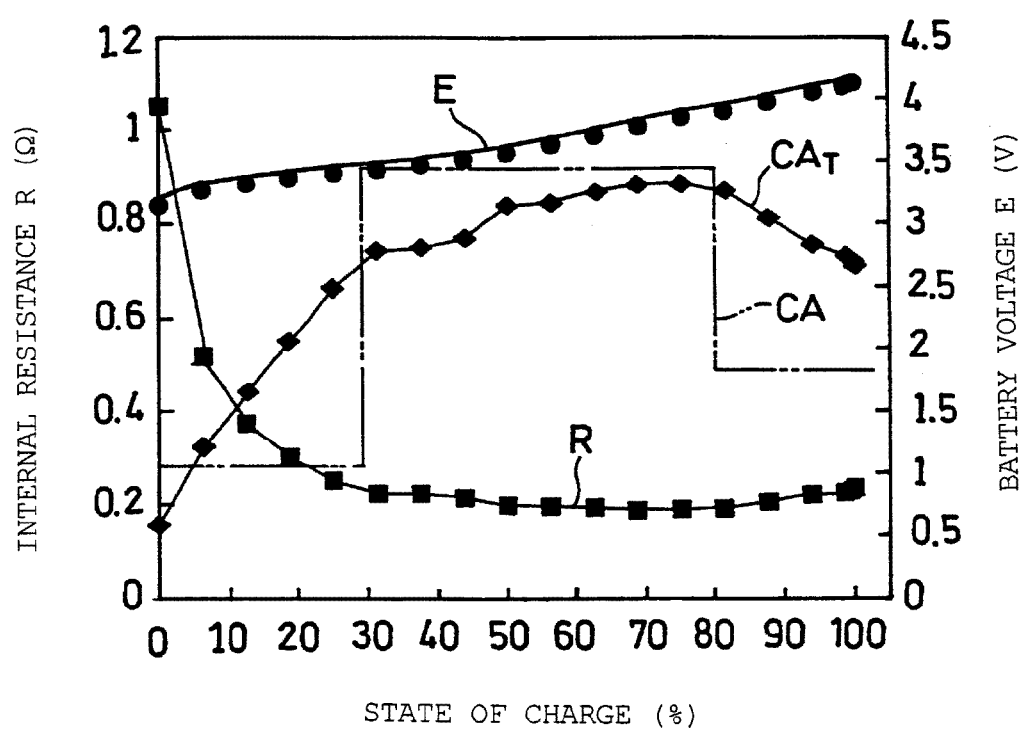
FIG. 5 is a graph showing one example of a charging method employed when the internal resistance characteristics relative to the state of charge of a secondary battery is analyzed by the GITT method.

FIG. 5 shows, in the form of a graph, one example of the relationship between a state of charge, and an internal resistance R and battery voltage E of a secondary battery. The internal resistance R of the secondary battery is measured by the GITT method.

In the measurement of internal resistance R by the GITT method, a secondary battery is charged at a comparatively small current for a predetermined period of time, followed by interval of charging for a predetermined period of time, and the charging and interval are repeated.

In the example of FIG. 5, a secondary battery having a capacity of 400 mAh is charged in such a manner that charging at a current of 0.2 C (74 mA) for 20 minutes and subsequent interval of charging for 30 minutes are repeated. Each black dot immediately below the curve representing the battery voltage E shows an open circuit voltage of the secondary battery detected at the end of the interval of charging and immediately before resuming the charging.

The measurement of internal resistance R by the GITT method is specifically performed by using a frequency response analyzer and measuring an AC impedance of the battery in the interval of charging, at each state of charge.

As shown in FIG. 5, the internal resistance R of the battery 11 measured as described above is extremely high when the battery 11 is nearly in a fully discharged state, and then drops sharply as the state of charge becomes high. In the example of FIG. 5, when the state of charge exceeds 30%, the internal resistance R drops to a value very close to the minimum value (0.18Ω).

As described above, the battery 11 has a very high internal resistance when being nearly in a fully discharged state. The more nearly the battery is in a fully discharged state, the more the charge polarization is increased when such a battery is charged at a constant current, because the charge polarization is proportional to the charge voltage. As a result, charging irregularity (non-uniform charging) occurs, which in turn causes, for example, an anisotropic expansion in the negative electrode active material layer. This results in a separation of the negative electrode active material, decomposition of the electrolyte, generation of reducing gas inside the battery, and other troubles. Consequently, the cycle characteristics of the non-aqueous electrolyte secondary battery deteriorate.

In order to prevent these troubles, in the method shown in FIG. 1, the battery 11 is charged at the comparatively small current value B in the range where the battery 11 is nearly in a fully discharged state (i.e., the range lower than the predetermined value X) to suppress the increase in the charge polarization. Then, the battery 11 is charged at the comparatively great current value A, when the battery is in a moderate state of charge in which the internal resistance is small. By charging in such a manner, it is possible to suppress the decomposition of the electrolyte and the destruction of crystals of the positive electrode active material in the non-aqueous electrolyte secondary battery. As a result, the generation of reducing gas inside the battery can be suppressed. Therefore, the cycle characteristics of the non-aqueous electrolyte secondary battery can be improved, and the deformation due to an increase in the internal pressure can be suppressed.

As described above, the predetermined value X is preferably set at a state of charge of 5 to 30%. When the predetermined value X is set at a state of charge of lower than 5%, the charge current may be switched to the comparatively great current value A, before the internal resistance of the secondary battery drops to a sufficient level. When this happens, the variation in charge polarization cannot be minimized sufficiently, and the effect to improve the cycle characteristics becomes small.

When the predetermined value X is set at a state of charge of 30% or higher, the timing at which the charge current is switched to the comparatively great current value A is delayed, resulting in a longer charging time. As such, by setting the predetermined value X appropriately at a value within the range of 5 to 30%, it is possible to obtain effects such as an effect to significantly improve the cycle characteristics of the secondary battery, without increasing the charging time.

The current value B is preferably 10 to 60% of the current value A. When the current value B exceeds 60% of the current value A, the variation in charge polarization may not be sufficiently minimized. When this happens, effects such as an effect to improve the cycle characteristics cannot be sufficiently obtained. When the current value B is less than 10% of the current value A, the charge current is too small, resulting in a longer charging time.

In addition, as shown in FIG. 5, the internal resistance R of the battery 11 turns to increase again when the state of charge reaches a certain level or higher. Because of this, in the examples shown in FIGS. 4 and 5, the charge current is switched again to the comparatively small current value C when the state of charge reaches 80% (the predetermined value Z). The current value C is preferably greater than the current value B. This is because, the amount of increase in the internal resistance R when the state of charge reaches a certain level or higher tends to be small in a non-aqueous electrolyte secondary battery using an alloy-formable negative electrode active material, as compared to the one using the conventional carbon-based negative electrode.

The predetermined value Z is preferably set at a state of charge of 65 to 90%. When the predetermined value Z is higher than a state of charge of 90%, the variation in charge polarization may not be minimized sufficiently. When this happens, effects such as an effect to improve the cycle characteristics cannot be sufficiently obtained. When the predetermined value Z is lower than a state of charge of 65%, the timing at which the charge current is switched to the comparatively small current value C is advanced, resulting in a longer charging time. As such, by setting the predetermined value Z at a state of charge of 65 to 90%, it is possible to obtain effects such as an effect to significantly improve the cycle characteristics of the secondary battery, as well as to charge the secondary battery for a comparatively short charging time.

The current value C is preferably 10 to 75% of the current value A. When the current value C exceeds 75% of the current value A, the variation in charge polarization may not be sufficiently minimized. When this happens, effects such as an effect to improve the cycle characteristics cannot be sufficiently obtained. When the current value C is less than 10% of the current value A, the charge current is too small, resulting in a longer charging time.

The charging as described above makes it possible to prevent the charge polarization from varying greatly with the change in the state of charge. Therefore, it is possible to obtain effects such as an effect to improve the cycle characteristics of the secondary battery. In order to more completely suppress the variation in charge polarization, it is ideal to adjust the charge current as indicated by the curve $CA_T$ in FIG. 5.

Embodiment 2

Next, one example of simultaneously charging two or more non-aqueous electrolyte secondary batteries is described.

Figure 6:
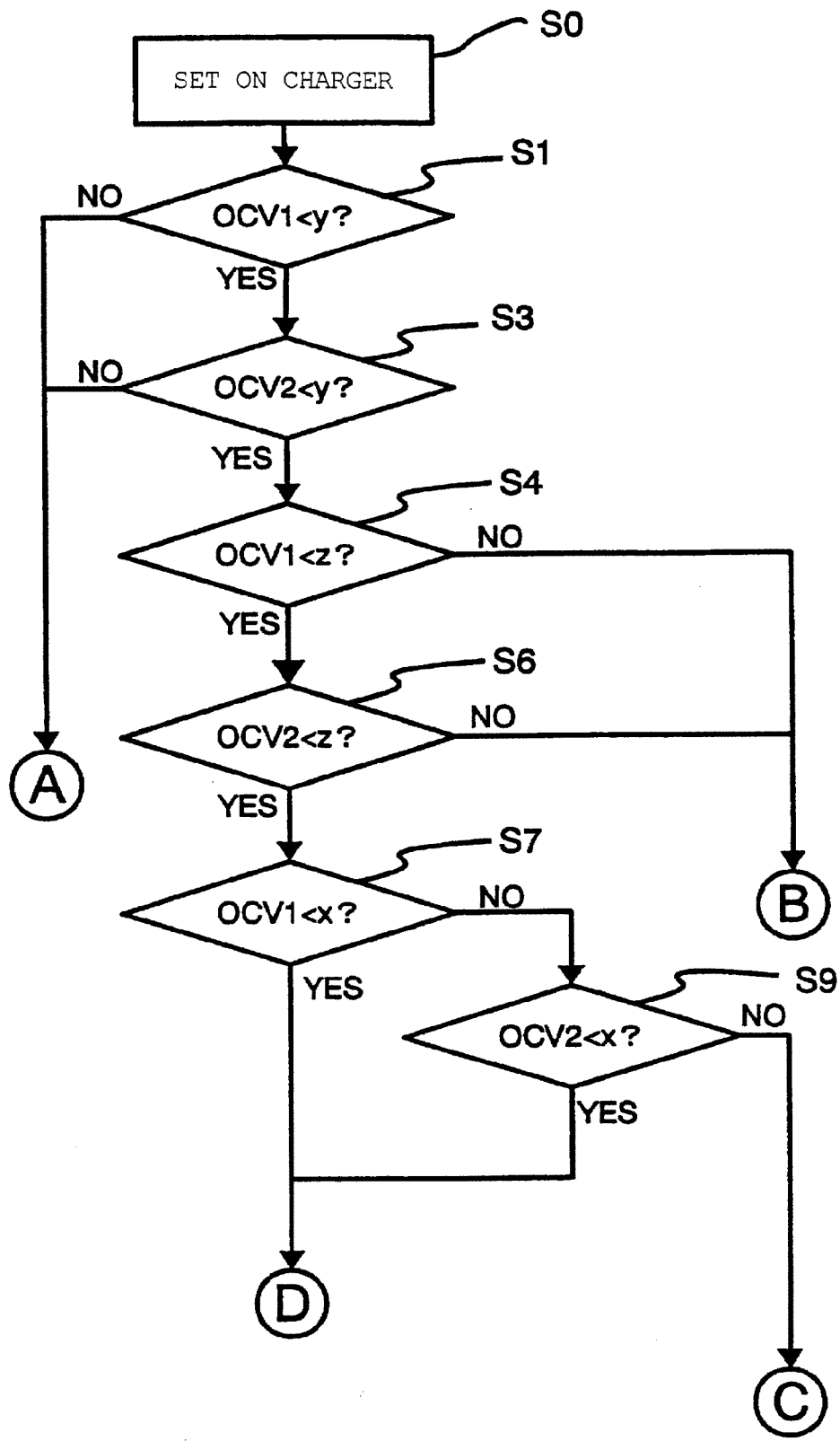
FIG. 6 is a flowchart for explaining a charging method for a non-aqueous electrolyte secondary battery according to another embodiment of the present invention.
Figure 7:
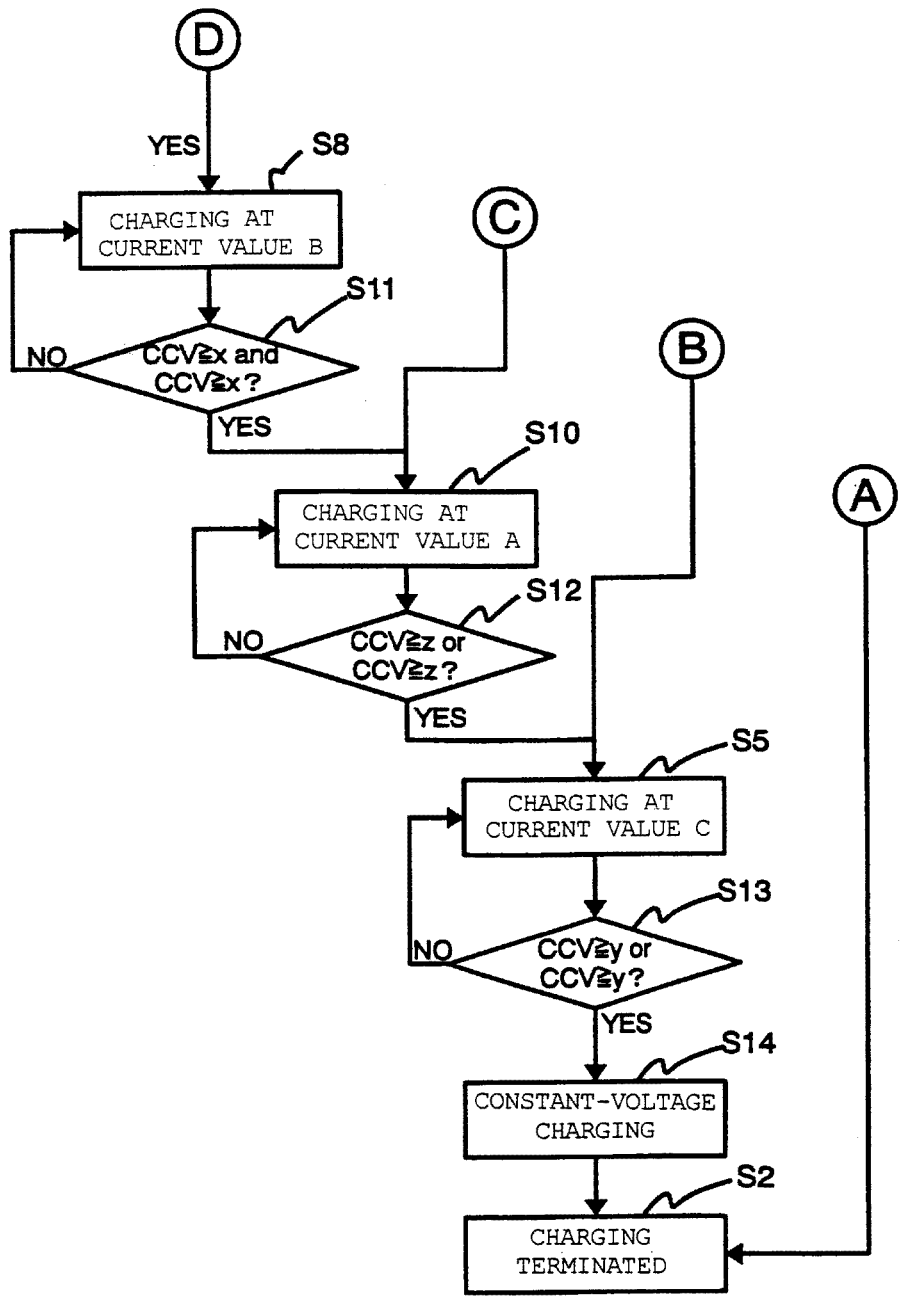
FIG. 7 is a flowchart for explaining a charging method for a non-aqueous electrolyte secondary battery according to still another embodiment of the present invention.
Figure 8:
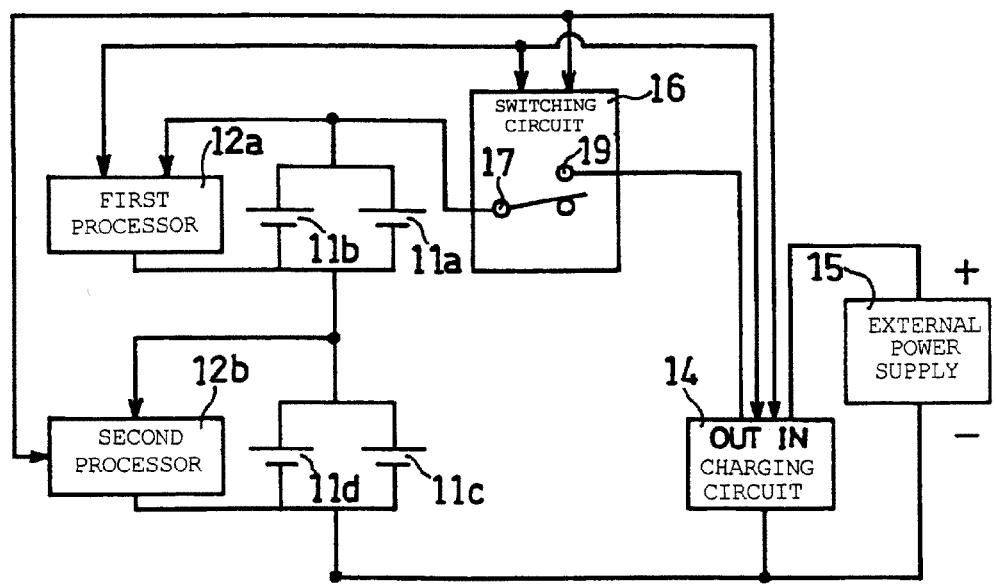
FIG. 8 is a block diagram showing a schematic configuration of a charger for a non-aqueous electrolyte secondary battery to which the charging method shown in FIGS. 6 and 7 are applied.

FIGS. 6 and 7 are flowcharts for explaining a charging method for two or more non-aqueous electrolyte secondary batteries, and FIG. 8 is a block diagram of a charger. Here, the components having the same function as those in FIG. 2 are denoted by the same reference numerals as in FIG. 2.

This circuit represents a configuration used when a group of secondary batteries (two in parallel and two in series) are charged simultaneously. Two secondary batteries 11a and 11b connected in parallel are connected in parallel with a first processor 12a including a first voltage detection unit for detecting an open circuit voltage of these batteries. Similarly, two secondary batteries 11c and 11d connected in parallel are connected in parallel with a second processor 12b including a second voltage detection unit for detecting an open circuit voltage of these batteries.

A pair of the secondary batteries 11a and 11b and a pair of the secondary batteries 11c and 11d are connected to each other in series. The first and second processors include first and second judgment units, respectively, for determining in which of the voltage regions K, M, L and N each of the detected voltage values falls.

The first and second processors 11a and 11b further include first and second control units, respectively, that cooperate with each other to control the charging circuit 14 and the switching unit 16, on the basis of the judgment of the first and second judgment units. One control unit may be provided in either only one of the first processor 11a or the second processor 11b. In this configuration, the judgment of the first and second judgment units is input into the one control unit.

Here, the two secondary batteries connected in parallel are collectively regarded as one secondary battery. In other words, in the present invention, two or more secondary batteries connected in parallel are handled as one secondary battery. This means that the present invention includes a charging method and a charger for charging two or more non-aqueous electrolyte secondary batteries connected in parallel, and does not exclude these.

Each of the first processor 12a and the second processor 12b is communicated with the charging circuit 14. The charger of FIG. 8 has the same configuration as that of FIG. 2 except the above.

Next, another example of carrying out the charging method of the present invention with the charger of FIG. 8 is described below with reference to the flowcharts of FIGS. 6 and 7.

First, the secondary batteries 11a to 11d are set on the charger (S0). Upon setting, while both the charge switch and the discharge switch in the switching circuit 16 are turned off, the first voltage detection unit in the first processor 12a detects an open circuit voltage of a parallel battery composed of the secondary batteries 11a and 11b, and the second voltage detection unit in the second processor 12b detects an open circuit voltage of a parallel battery composed of the secondary batteries 11c and 11d.

Secondly, the first judgment unit in the first processor 12a compares the value (OCV1) detected by the first voltage detection unit with a predetermined voltage y (S1). When the comparison result is OCV1$\geq$y, the parallel battery composed of the secondary batteries 11a and 11b is regarded as having reached a full state of charge, and no charging is performed (S2).

When OCV1<y, the second judgment unit in the second processor 12b compares the value (OCV2) detected by the second voltage detection unit with the predetermined voltage y (S3). When the comparison result is OCV2$\geq$y, the parallel battery composed of the secondary batteries 11c and 11d is regarded as having reached a full state of charge, and no charging is performed (S2). In short, when at least one of OCV1$\geq$y and OCV2$\geq$y is satisfied, no charging is performed.

When OCV1<y and OCV2<y, the first judgment unit in the first processor 12a compares the detected value (OCV1) with a predetermined voltage z (S4). When OCV1≧z, namely, z≦OCV1<y, the first processor 12a turns on the charge switch in the switching circuit 16, and sets the output from the charging circuit 14 such that each parallel battery is charged at a comparatively small current value C (S5).

When OCV1<z, the second judgment unit in the second processor 12b further compares the detected value (OCV2) with the predetermined voltage z (S6). When the comparison result is OCV2≧z, namely, z≦OCV2<y, the second processor 12b turns on the charge switch in the switching circuit 16, and sets the output from the charging circuit 14 such that each parallel battery is charged at the comparatively small current value C (S5). In short, when at least one of z≦OCV1<y and z≦OCV2<y is satisfied, charging is performed at the comparatively small current value C.

When OCV1<z and OCV2<z, the first judgment unit in the first processor 12a compares the detected value (OCV1) with a predetermined voltage x (S7). When OCV1<x, the first processor 12a turns on the charge switch in the switching circuit 16, and sets the output from the charging circuit 14 such that each parallel battery is charged at a comparatively small current value B (S8).

When OCV1≧x, namely, x≦OCV1<z, the second judgment unit in the second processor 12b further compares the detected value (OCV2) with the predetermined voltage x (S9). When the comparison results is OCV2<x, the second processor 12b turns on the charge switch in the switching circuit 16, and sets the output from the charging circuit 14 such that each parallel battery is charged at the comparatively small current value B (S8). In short, when at least one of OCV1<x and OCV2<x is satisfied, charging is performed at the comparatively small current value B.

When OCV1≧x and OCV2≧x, namely, x≦OCV1<z and x≦OCV2<z, the first and second processors 12a and 12b turn on the charge switch in the switching circuit 16, and set the output from the charging circuit 14 such that each parallel battery is charged at the comparatively great current value A (S10). In short, only when both of the parallel batteries are in a moderate state of charge, charging is performed at the comparatively great current value A.

During the charging at the current value B (S8), at the time when a predetermined period of time has passed from the start of the charging, the closed circuit voltage (CCV) of each parallel battery is detected, and compared with the predetermined voltage x (S11). When either one of the CCVs of the parallel batteries is below the predetermined voltage x, the charging at the current value B is continued (S8). When both of the CCVs of the parallel batteries are or exceed the predetermined voltage x, the charging is switched to a charging at a current value A (S10). The step S11 is repeated every time when the predetermined period of time has passed, until both of the CCVs of the parallel batteries reach the predetermined voltage x.

During the charging at the current value A (S10), at the time when a predetermined period of time has passed from the start of the charging, the closed circuit voltage (CCV) of each parallel battery is detected, and compared with the predetermined voltage z (S12). When both of the CCVs of the parallel batteries are below the predetermined voltage z, the charging at the current value A is continued (S10). When either one of the CCVs of the parallel batteries is or exceeds the predetermined voltage z, the charging is switched to a charging at a current value C (S5). The step S12 is repeated every time when the predetermined period of time has passed, until either one of the CCVs of the parallel batteries reaches the predetermined voltage z.

During the charging at the current value C (S5), at the time when a predetermined period of time has passed from the start of the charging, the closed circuit voltage (CCV) of each parallel battery is detected, and compared with the predetermined voltage y (S13). When both of the CCVs of the parallel batteries are below the predetermined voltage y, the charging at the current value C is continued (S5). When either one of the CCVs of the parallel batteries is or exceeds the predetermined voltage y, the charging is switched to a predetermined constant-voltage charging (S14). The step S13 is repeated every time when the predetermined period of time has passed, until either one of the CCVs of the parallel batteries reaches the predetermined voltage y.

When the constant-voltage charging is completed, the secondary battery 11 is regarded as having reached a full state of charge, and the charging is terminated (S2).

Examples of the present invention are described below. However, the present invention is not limited to the following examples.

A lithium ion secondary battery was fabricated in the manner as described below.

(1) Production of Positive Electrode Plate

In a reaction bath with a stirrer, an aqueous solution of nickel sulfate (2 mol/L), an aqueous solution of cobalt sulfate (0.353 mol/L), an aqueous solution of ammonium nitrate (5 mol/L), and an aqueous solution of sodium hydroxide (10 mol/L) were put, and stirred with the stirrer. The resultant hydroxide was washed with water, dehydrated and dried, to prepare a nickel hydroxide represented by the composition formula $Ni_{0.85}Co_{0.15}(OH)_2$.

The nickel hydroxide obtained in the above was mixed with lithium hydroxide such that the atomic ratio of lithium: (nickel+cobalt) was 1.03:1, and baked at 750° C. for 10 hours in an oxygen atmosphere, to synthesize $LiNi_{0.85}Co_{0.15}O_2$ serving as a positive electrode active material.

The positive electrode active material thus obtained was mixed with carbon black serving as a conductive agent, and an aqueous dispersion of polytetrafluoroethylene serving as a binder in a solid mass ratio of 100:3:10, and kneaded and dispersed. The resultant mixture was suspended in an aqueous solution of carboxymethyl cellulose, to prepare a positive electrode material mixture paste. This positive electrode material mixture paste was applied onto both surfaces of a current collector made of a 30-μm-thick aluminum foil by a doctor blade method, such that the overall thickness thereof reached about 230 μm. Here, the overall thickness is a sum of the thicknesses of the current collector and the paste applied onto both surfaces of the current collector.

After having being dried, the current collector with paste was rolled to a thickness of 180 μm and cut into a predetermined size, to give a positive electrode plate. A positive electrode lead made of aluminum was welded to a portion of the current collector on which no positive electrode active material layer was formed.

(2) Production of Negative Electrode Plate

A copper alloy foil (thickness 26 μm) including 0.03% by weight of zirconia was subjected to emboss processing using a 50-mm-diameter emboss roll having a surface with a number of pores (i.e., circular recesses each having a diameter of 20 μm and a depth of 8 μm), to form a current collector for negative electrode with a number of protrusions formed on the surface thereof.

The negative electrode current collector thus formed was placed in the vacuum chamber of a commercially available vacuum vapor deposition apparatus (available from ULVAC, Inc.), and silicon with purity of 99.9999% available from Kojundo Chemical Laboratory Co., Ltd. was vaporized by electron beams under high vacuum. At this time, oxygen gas was introduced at a rate of about 80 sccm. In such a manner, a column of silicon oxide was formed on each of the protrusions of the negative electrode current collector. The amount of oxygen included in the columns was determined by a combustion method. The result showed that the composition of the compound forming the columns was $SiO_{0.5}$.

Next, lithium metal was vapor deposited on the surface of the negative electrode active material layer. By vapor depositing lithium metal, lithium was supplemented in the amount corresponding to the irreversible capacity stored in the negative electrode active material layer during initial charging and discharging. The vapor deposition of lithium metal was performed by using a resistance heating vapor deposition apparatus (available from ULVAC, Inc.) in an argon atmosphere. Specifically, lithium metal was placed on the tantalum boat in the resistance heating vapor deposition apparatus, and the negative electrode was fixed such that the negative electrode active material layer faced the tantalum boat. Then, the atmosphere in the apparatus was set to an argon atmosphere, and a current of 50 A was allowed to flow through the tantalum boat for 10 minutes. Lithium was thus vapor deposited on the surface of the negative electrode.

(3) Fabrication of Battery

The positive electrode plate and the negative electrode plate produced in the above were wound with a polyethylene microporous film (a separator, trade name: Hipore, thickness: 20 μm, available from Asahi Kasei Corporation) interposed therebetween, to form an electrode group. Subsequently, one end of a positive electrode lead made of aluminum was welded to the positive electrode current collector in the positive electrode plate; and one end of a negative electrode lead made of nickel was welded to the negative electrode current collector in the negative electrode plate.

The electrode group was inserted together with a non-aqueous electrolyte into a housing case made of aluminum laminate sheet. As the non-aqueous electrolyte, a solution prepared by dissolving $LiPF_6$ at a concentration of 1.4 mol/L in a mixed solvent containing ethylene carbonate (EC), ethyl methyl carbonate (EMC) and diethyl carbonate (DEC) in a ratio of 2:3:5 by volume.

Next, the positive electrode lead and the negative electrode lead were extended outside of the housing case through the openings of the housing case, and the openings of the housing case were welded while the interior of the housing case was evacuated to a vacuum.

In the manner as described above, a predetermined number of lithium ion secondary batteries were fabricated.

EXAMPLE 1

With respect to 30 batteries sampled at random from the above predetermined number of lithium ion secondary batteries, a charge/discharge treatment was performed under the below-described conditions. The charge/discharge treatment was performed while the batteries were placed in a constant-temperature bath (25° C.) for charge/discharge test.

In charging, the batteries whose state of charge was 0% were subjected to constant-current and constant-voltage charging until the state of charge reached 100%. More specifically, when the battery voltage was within the range of 3.2 V or more and less than 3.4 V (i.e., when the state of charge was within the range of 0% or higher and lower than 30%), the batteries were charged at a constant current of 0.3 C (120 mA). When the battery voltage was within the range of 3.4 V or more and less than 3.9 V (i.e., when the state of charge was within the range of 30% or higher and lower than 80%), the batteries were charged at a constant current of 0.9 C (360 mA).

When the battery voltage was within the range of 3.9 V or more and less than 4.15 V (i.e., when the state of charge was within the range of 80% or higher and lower than 100%), the batteries were charged at a constant current of 0.5 C (200 mA). After the battery voltage reached 4.15 V, the batteries were charged at a constant voltage of 4.15 V. When the charge current was reduced to 0.05 C (20 mA), the constant-voltage charging was terminated.

Discharging was performed after the charged batteries have been allowed to stand for 10 minutes, at a constant current of 1.0 C (400 mA) until the battery voltage reached 2 V.

EXAMPLE 2

In charging, when the battery voltage was within the range of 3.2 V or more and less than 3.4 V (i.e., when the state of charge was within the range of 0% or higher and lower than 30%), constant-current charging was performed at 0.3 C (120 mA). When the battery voltage was within the range of 3.4 V or more and less than 3.9 V (i.e., when the state of charge was within the range of 30% or higher and lower than 80%), constant-current charging was performed at 0.9 C (360 mA). When the battery voltage was within the range of 3.9 V or more and less than 4.15 V (i.e., when the state of charge was within the range of 80% or higher and lower than 100%), constant-current charging was performed at 0.3 C (120 mA). When the charge current reached 4.15 V, the constant-current charging was switched to constant-voltage charging.

With respect to 30 lithium ion secondary batteries, a charge/discharge treatment was performed in the same manner as in Example 1, except the above.

COMPARATIVE EXAMPLE 1

In charging, constant-current charging was performed at 0.7 C (280 mA) until the battery voltage reached 4.15 V, and, at the time when the battery voltage reached 4.15 V, was switched to constant-voltage charging.

With respect to 30 lithium ion secondary batteries, a charge/discharge treatment was performed in the same manner as in Example 1, except the above.

COMPARATIVE EXAMPLE 2

In charging, when the battery voltage was within the range of 3.2 V or more and less than 3.4 V (i.e., when the state of charge was within the range of 0% or higher and lower than 30%), constant-current charging was performed at 1.1 C (440 mA). When the battery voltage was within the range of 3.4 V or more and less than 3.9 V (i.e., when the state of charge was within the range of 30% or higher and lower than 80%), constant-current charging was performed at 0.3 C (120 mA). When the battery voltage was within the range of 3.9 V or more and less than 4.15 V (i.e., when the state of charge was within the range of 80% or higher and lower than 100%), constant-current charging was performed at 0.3 C (120 mA). When the charge current reached 4.15 V, the constant-current charging was switched to constant-voltage charging.

With respect to 30 lithium ion secondary batteries, a charge/discharge treatment was performed in the same manner as in Example 1, except the above.

[Battery Capacity Evaluation Test]

With respect to 10 out of 30 lithium ion secondary batteries of each of Examples 1 and 2 and Comparative Examples 1 and 2, the above charge/discharge treatment was performed once, to measure an average discharge capacity at this time. The results are shown in the column "discharge capacity" in Table 1.

[Charge/Discharge Cycle Characteristic Test]

With respect to the 10 lithium ion secondary batteries of each of Examples 1 and 2 and Comparative Examples 1 and 2, the above charge/discharge treatment was further performed 100 times, that is, the above charge/discharge treatment was performed 101 times in total, to measure a discharge capacity at the $101^{st}$ cycle. The average of the percentages of the discharge capacity at the $101^{st}$ cycle relative to the $1^{st}$ discharge capacity (the cycle capacity retention rate, %) was calculated. The results are shown in the column "capacity retention rate" in Table 1.

[Battery Expansion Measurement]

With respect to another 10 out of 30 lithium ion secondary batteries of each of Examples 1 and 2 and Comparative Examples 1 and 2, only the charging in the above charge/discharge treatment was performed once. In that state, the batteries were disassembled, and the thickness of the electrode group of each battery was measured.

With respect to the remaining 10 out of 30 lithium ion secondary batteries of each of Examples 1 and 2 and Comparative Examples 1 and 2, the charge/discharge treatment was performed until the charging at the $101^{st}$ cycle of the above charge/discharge treatment was completed. In that state, the batteries were disassembled, and the thickness of the electrode group of each battery was measured.

The difference between the thickness after charging of the electrode group after the charging at the $101^{st}$ cycle and the thickness of the electrode group after the charging at the $1^{st}$ cycle was calculated. The average of the percentages of the calculated difference relative to the thickness of the electrode group after the charging at the $1^{st}$ cycle was calculated as battery expansion. The results are shown in the column "battery expansion rate" in Table 1.

TABLE 1

|  | Discharge capacity (mAh) | Capacity retention rate (%) | Battery expansion rate (%) |
| --- | --- | --- | --- |
| Example 1 | 379 | 93 | 6 |
| Example 2 | 379 | 91 | 10 |
| Comparative Example 1 | 381 | 89 | 15 |
| Comparative Example 2 | 376 | 86 | 18 |

As shown in Table 1, Examples 1 and 2 and Comparative Examples 1 and 2 exhibited no significant difference in the discharge capacity at the $1^{st}$ cycle. The capacity retention rates determined upon completion of 100 cycles of charge/discharge treatment in Examples 1 and 2 were higher than those in Comparative Examples 1 and 2. This indicates that the charging method of the present invention is effective in improving the cycle characteristics. Comparison between Example 1 and Example 2 shows that the capacity retention rate in Example 1 was higher than in Example 2. This indicates that it is effective to set the rate of reducing the charge current when the state of charge is high to be smaller than that when the state of charge is low, in order to improve the cycle characteristics.

Further, the battery expansion rates determined upon completion of 100 cycles of charge/discharge treatment in Examples 1 and 2 were smaller than those in Comparative Examples 1 and 2. This result indicates that the amount of generated oxidizing gas was small in Examples 1 and 2. Comparison between Example 1 and Example 2 shows that the battery expansion rate in Example 1 was smaller than in Example 2. This indicates that it is effective to set the rate of reducing the charge current when the state of charge is high to be smaller than that when the state of charge is low, in order to improve the cycle characteristics.

Furthermore, each of the batteries in the state where the charging at the $101^{st}$ cycle was completed was disassembled and observed. The result shows that in Comparative Example 2, particularly the negative electrode, or the negative electrode active material has been expanded greatly. This is presumably because a large charge current was allowed to flow when the state of charge was high, and the charging irregularity was increased. As the charging irregularity is increased, the imbalance between the expansion and contraction of the active material is accelerated. Presumably because of this, the active material was abnormally expanded.

The above results show that applying the present invention can improve the cycle characteristics of a lithium ion secondary battery and suppress the change in shape of the lithium ion secondary battery even after a long term use.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

According to the charging method and charger of the present invention, the constant-current charging of a non-aqueous electrolyte secondary battery is performed in two or more stages, each at a different current value, and the current value in the first stage is set relatively small. This makes it possible to improve the cycle characteristics of the secondary battery. The charging method and charger of the present invention are particularly suitably applicable to the charging of a lithium ion secondary battery.

| [Reference Signs List] | |
| --- | --- |
| 11 | Secondary battery |
| 11a | Secondary battery |
| 11b | Secondary battery |
| 11c | Secondary battery |
| 11d | Secondary battery |
| 12 | Processor |
| 12a | First processor |
| 12b | Second processor |
| 14 | Charging circuit |
| 15 | External power supply |
| 16 | Switching circuit |
| 17 | Terminal |
| 19 | Terminal |

The invention claimed is:

1. A charging method for a non-aqueous electrolyte secondary battery which comprises a positive electrode including a lithium-containing composite oxide as an active material, a negative electrode including an alloy-formable negative electrode active material, and a non-aqueous electrolyte, the charging method comprising steps of:

(a) detecting a state of charge of the secondary battery;

(b) comparing the detected state of charge with a predetermined value X, a predetermined value Y, and a predetermined value Z, satisfying Y>Z>X; and (c) on the basis of the comparison result,
(i) when the detected state of charge is equal to or higher than the predetermined value Y, performing constant-voltage charging or terminating charging,
(ii) when the detected state of charge is equal to or higher than the predetermined value X and lower than the predetermined value Z, performing constant-current charging at a current value A until the detected state of charge reaches a predetermined state of charge,
(iii) when the detected state of charge is lower than the predetermined value X, performing constant-current charging at a current value B, and
(iv) when the detected state of charge is equal to or higher than the predetermined value Z and lower than the predetermined value Y, performing constant-current charging at a current value C satisfying B<C<A.

2. The charging method for a non-aqueous electrolyte secondary battery in accordance with claim 1, wherein the step of detecting a state of charge includes a step of detecting an open circuit voltage or a closed circuit voltage of the secondary battery.

3. The charging method for a non-aqueous electrolyte secondary battery in accordance with claim 1, wherein the predetermined value X is a state of charge of 5 to 30%.

4. The charging method for a non-aqueous electrolyte secondary battery in accordance with claim 1, wherein the predetermined value Z is a state of charge of 65 to 90%.

5. The charging method for a non-aqueous electrolyte secondary battery in accordance with claim 1, wherein the current value B is 10 to 60% of the current value A.

6. The charging method for a non-aqueous electrolyte secondary battery in accordance with claim 1, wherein the current value C is 10 to 75% of the current value A.

7. The charging method for a non-aqueous electrolyte secondary battery in accordance with claim 1, wherein the current value C is greater that the current value B.

8. A charger for a non-aqueous electrolyte secondary battery which comprises a positive electrode including a lithium-containing composite oxide as an active material, a negative electrode including an alloy-formable negative electrode active material, and a non-aqueous electrolyte, the charger comprising:

a voltage detection unit for detecting a voltage of the secondary battery;

a state-of-charge detection unit for detecting a state of charge of the secondary battery on the basis of the detected voltage;

a current supply circuit for supplying a current from an external or internal DC power supply to the secondary battery with changing a value of the current stepwise;

a switch for switching an electrically connected state between the secondary battery and the current supply circuit;

a judgment unit for comparing the detected state of charge with a predetermined value X, a predetermined value Y, and a predetermined value Z satisfying Y>Z>X, to make judgment on the detected state of charge; and a control unit for controlling the switch and the current supply circuit on the basis of the judgment of the judgment unit, in such a manner that
(i) when the detected state of charge is equal to or higher than the predetermined value Y, performing constant-voltage charging or terminating charging,
(ii) when the detected state of charge is equal to or higher than the predetermined value X and lower than the predetermined value Z, performing constant-current charging at a current value A until the detected state of charge reaches a predetermined state of charge,
(iii) when the detected state of charge is lower than the predetermined value X, performing constant-current charging at a current value B, and
(iv) when the detected state of charge is equal to or higher than the predetermined value Z and lower than the predetermined value Y, performing constant-current charging at a current value C satisfying B<C<A.

* * * * *